Patented Aug. 18, 1953

2,649,354

UNITED STATES PATENT OFFICE 2,649,354

PROCESS FOR IMPROVING FASTNESS PROPERTIES OF DIRECT DYESTUFFS

Hans Martin Hemmi, Basel, Switzerland, and Paul Trefzer, Milan, Italy, assignors to Sandoz Limited, Basel, Switzerland, a Swiss firm No Drawing. Original application December 1, 1947, Serial No. 789,134. Divided and this application February 8, 1950, Serial No. 143,162. In Switzerland December 3, 1946

11 Claims. (Cl. 8—74)

The present application is a division of our copending application Ser. No. 789,134 filed December 1, 1947, now Patent No. 2,622,075.

The present invention relates to a method for improving the fastness properties of dyeings and printings made on textile material and the like with direct dyestuffs, and to the resultant dyed and printed products.

A primary object of the invention is to effect an improvement in the fastness of dyeings and printings produced on textile materials with direct dyestuffs, by the treatment of such dyeings and printings with a water-soluble polymeric organic nitrogen compound obtained by condensing an amine of the formula

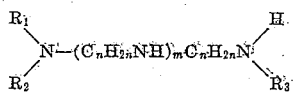

wherein $R_1$, $R_2$ and $R_3$ each represents a member of the group consisting of hydrogen, oxyalkyl and alkyl; $n$ being two or three and $m$ representing a positive integer, with dicyandiamide. Such condensation being, according to the present invention, carried out at elevated temperature and involving splitting off of ammonia, the resultant condensation product corresponds to the formula

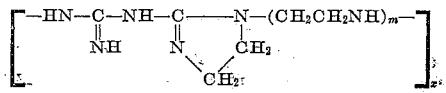

wherein $m$ is a positive integer and $x$ is an integer greater than one.

In lieu of the said condensation products, it is also possible according to the invention to utilize the complex copper compounds of said condensation products for the aforementioned treatment.

Still another object of the invention is to provide materials dyed or printed with direct dyestuffs, which dyeings or printings are fast to water, acid boil, wet ironing, steaming and especially to washing in neutral and alkaline medium at elevated temperatures.

Other objects will be apparent from the specification and claims.

Suitable amines of the general formula

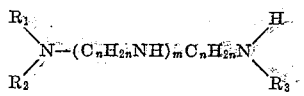

are for example diethylenetriamine, triethylenetetramine or high molecular polyethylenepolyamines, polypropylenepolyamines, di-(hydroxypropylene)-triamines or high molecular poly-(hydroxy propylene)-polyamines, or derivatives reacting in the same way as these amines, for example, carbonates or carbamates thereof.

The final products are basic sirupy or thick, almost colourless liquids or solid substances, which with the aid of organic or inorganic acids can be converted into salts. The basic products or their water-soluble salts are suitable by themselves or in combination with water-soluble salts of the polyvalent metals such as copper, for improving the fastness properties of dyeings with substantive dyestuffs, for the preparation of pigments or for the animalisation of cellulosic fibres.

They possess furthermore the property of precipitating acid dyestuffs from their aqueous solutions.

Other methods of applying the principle of this invention may be employed instead of those explained, for it will be apparent that obvious modification thereof may be made within the skill of art without departing from the scope of the appended claims.

The preparation of the compounds described may be further illustrated by the following specific examples in which the indications can be varied within wide limits.

Example 1

146 parts of triethylenetetramine, boiling point 270–271° C., and 84 parts of dicyandiamide are placed in a vessel fitted with stirring gear and a short reflux condenser and the temperature is increased to 100–110° C., whereupon evolution of ammonia ensues. At 110° C. the mass becomes clear, and after decrease of the reaction the temperature is increased to 140° C. and maintained at that point. After 14 to 16 hours the mass is withdrawn, cooled and powdered. It can be used as such or in the form of its neutral salt, if desired together with copper salts for the improvement of the fastness of dyeings with substantive dyestuffs.

Example 2

47.5 parts of tetraethylenepentamine and 42 parts of dicyandiamide are placed in a suitable vessel fitted with stirring gear and a reflux condenser and heated with stirring. The mass foams strongly and begins to evolve ammonia at 115–125° C. The temperature is increased slowly to 140° C. and then to 160–170° C., and the whole is stirred for 6 to 9 hours during which the mass becomes more and more viscous. The yield amounts to 75–77 parts. With the aid of this nitrogenous condensation product or with the salts thereof substantive dyestuffs for example can be after-treated for the purpose of preventing bleeding in hot baths.

Example 3

20.6 parts of polyethylenepolyamine, boiling point at 12 mm. over 190° C., and 16.8 parts of dicyandiamide are mixed in a suitable vessel fitted with stirring gear and maintained for 3 to 5 hours at 125–165° C. A sample should be still soluble in water. If the mass becomes too thick the stirring is stopped and the heating continued without stirring. The condensation product obtained is powdered after cooling. It can be used as such or in the form of a water-soluble salt or in the form of a copper complex.

*Example 4*

30.9 parts of diethylenetriamine, boiling point 205–207° C. are placed in a vessel fitted with stirring gear and 24.8 parts of dicyandiamide added with stirring. The product is warmed to about 100° C., whereby the material begins to evolve ammonia. The temperature is then slowly raised to 145–160° C. The originally liquid product becomes thereby more and more viscous. After 5–8 hours the reaction is interrupted and the product poured out, allowed to cool and powdered. The newly formed condensation product itself as well as its water-soluble organic or inorganic salts or metal complexes improve all the wet fastnesses of substantive dyestuffs, in particular the fastness to washing in alkaline soap and soda baths.

*Example 5*

51.5 parts of diethylene triamine and 82 parts of dicyandiamide are placed in a vessel fitted with stirring gear. It is warmed, and at a temperature of 100° C. ammonia begins to evolve, this evolution becoming increasingly strong with increasing temperature. The temperature is raised to 135–180° C. within 4–8 hours. Thereupon the mass which is then only movable with the most powerful stirring gear is emptied out and powdered after cooling. It has similar properties to the substance prepared according to Example 4.

*Example 6*

20.4 parts of diethylenetriamine, boiling point 205–207° C. and 16.8 parts of cyanamide, melting point 38–42° C. are introduced into a vessel fitted with stirring gear and a reflux condenser and gradually warmed, the cyanamide being polymerised to dicyandiamide. The temperature increases rapidly and by regulating the heating, or by cooling if necessary, the reaction is kept under control. At 60–70° C. evolution of ammonia begins, and the temperature is then gradually increased to 130–150° C. and finally to about 170° C. The process is concluded after 10 hours. The thick viscous liquid product is poured out and after cooling is powdered. It can be used in the form of a water-soluble salt of an organic or inorganic acid or if desired in the form of a water-soluble complex of a polyvalent metal, e. g. a copper complex, for the improvement of the fastness of dyeings of textile materials with substantive dyestuffs.

Instead of cyanamide, dicyandiamide can be used with the same result. For the conversion of the base obtained into a water-soluble salt the following process can be used.

50 parts of the base are powdered and made into paste with 40 parts of water at 30° C. 18.5 parts of sulfuric acid (d=1.84) are diluted with 20 cc. of water and cooled. This acid is added with good stirring to the paste containing water. The temperature of neutralisation should not exceed 50° C., and if desired it is controlled by the addition of ice. When the neutralisation is finished it is stirred for a further hour, and the whole is evaporated to dryness in a vacuo at 70–90° C. A water-soluble powder is thus obtained.

Instead of sulfuric acid an equivalent quantity of any mono- or polybasic acid can be used, such as hydrochloric acid, phosphoric acid, citric acid, tartaric acid, itaconic acid, etc.

*Example 7*

45 parts of diethylenetriamine and 37.8 parts of dicyandiamide are placed in a vessel fitted with stirring gear and the whole maintained at a temperature of 107–157° C. for 6–8 hours, cooled and ground. If 45 parts of the product thus obtained are dissolved in 200 parts of water and neutralized with 27 parts of 36.5 per cent hydrochloric acid and 15 parts of hydrated copper sulfate in 60 parts of water added thereto, there is obtained a turbid solution of the copper complex, which is evaporated to dryness in the usual manner and gives a water-soluble green powder which renders substantive dyeings on textiles fast to washing and to light.

*Example 8*

66 parts of diethylenetriamine carbonate, as is obtained in a crystalline form by the introduction of carbon dioxide into an alcoholic solution of diethylenetriamine, are melted and mixed with 33.6 parts of dicyandiamide in a closed vessel fitted with stirring gear. It is then warmed during 6 hours at 140–160° C., whereby the mass becomes continuously thicker until it is finally hardly capable of being stirred. It is allowed to cool and the solidified bubble-containing product is powdered. This product is basic and can be used as such or in the form of a water-soluble salt.

The condensation products obtained according to Examples 1 to 8 can be used in the following manner in concentrations of 0.1–2.0 grams per litre for the improvement of the fastness properties of dyeings with substantive dyestuffs, in which either the condensation product itself or also its water-soluble salts or complexes with polyvalent metals can be used.

*Example 9*

Viscose dyed with 2 per cent of Solar Violet BL (Schultz Farbstofftabellen, 1. Ergänzungsband, 1934, page 133) is introduced into a solution of 0.3 gram per litre of one of the condensation products described in Examples 1 to 8, the ratio of the quantity of the material to the quantity of liquid in the bath being 1 to 30. The dyeing is treated at temperatures between 20 and 100° C. for 5–20 minutes with frequent moving about. The material thus after-treated can be centrifuged and dried with or without intermediate rinsing, and after-treatment at a higher temperature in certain cases improves the fastness to washing and dyeings with substantive dyestuffs to a still greater extent. Hot drying is in no way necessary as the still wet directly centrifuged material shows an excellent fastness to alkaline washing liquids without any intermediate drying.

Dyeings with other substantive dyestuffs, e. g. such as those with Solar Rubinol B, Solar Grey 2BL (Schultz Farbstofftabellen, 2. Ergänzungsband, 1934, page 260) and Solar Grey R (Schultz Farbstofftabellen, 1. Ergänzungsband, 1934, page 133) will be improved with the above named condensation products.

Instead of dyeings, printings prepared in the usual manner with said dyestuffs may be treated with the condensation products mentioned in the preceding examples or with soluble salts or soluble polyvalent metal derivatives thereof, in order to improve the fastness properties of these printings.

What we claim is:

1. A process for improving the fastness properties of dyeings and printings produced with direct dyestuffs which comprises treating such dyeings and printings with a member selected from the group consisting of a water-soluble polymeric organic nitrogen compound, obtained by heating, as sole reactants, one mol of an amine of the formula $$H_2N(C_2H_4NH)_mC_2H_4NH_2$$

wherein $m$ is a positive integer, with two equivalents of a compound selected from the group consisting of monomeric and dimeric cyanamide until ammonia is evolved and then raising the temperature to between about 125° and about 180° C. and maintaining it between these limits for several hours, and the water-soluble salts and complex copper compounds thereof.

2. A process for improving the fastness properties of dyeings and printings produced with direct dyestuffs which comprises treating such dyeings and printings with a member selected from the group consisting of a water-soluble polymeric organic nitrogen compound obtained by heating, as sole reactants, one mol of an amine of the formula $$H_2N(C_2H_4NH)_mC_2H_4NH_2$$

wherein $m$ is a positive integer, with one mol of dicyandiamide to a temperature of about 100° to about 125° C. whereby ammonia is evolved and then maintaining the temperature at about 125° to about 180° C. for several hours, and the water-soluble salts and complex copper compounds thereof.

3. A process for improving the fastness properties of dyeings and printings produced with direct dyestuffs, which comprises treating such dyeings and printings with a water-soluble polymeric organic nitrogen compound, obtained by heating, as sole reactants, one mol of diethylenetriamine and one mol of dicyandiamide to a temperature of about 125° C. to about 180° C. for several hours, whereby ammonia is evolved.

4. A process for improving the fastness properties of dyeings and printings produced with direct dyestuffs which comprises treating such dyeings and printings with a water-soluble polymeric organic nitrogen compound, obtained by heating, as sole reactants, one mol of trithylenetetramine and one mol of dicyandiamide to a temperature of about 140° C. for several hours, whereby ammonia is evolved.

5. A process for improving the fastness properties of dyeings and printings produced with direct dyestuffs, which comprises treating such dyeings and printings with a water-soluble polymeric organic nitrogen compound, obtained by heating, as sole reactants, one mol of tetraethylenepentamine with one mol of dicyandiamide to a temperature of about 115° C. to about 170° C. for several hours, whereby ammonia is evolved.

6. A process for improving the fastness properties of dyeings and printings produced with direct dyestuffs, which comprises treating such dyeings and printings with a complex copper compound of a water-soluble polymeric organic nitrogen compound obtained by heating, as sole reactants, one mol of an amine of the formula $$H_2N(C_2H_4NH)_mC_2H_4NH_2$$

wherein $m$ is a positive integer, with two equivalents of a compound selected from the group consisting of monomeric and dimeric cyanamide until ammonia is evolved and then raising the temperature to between about 125° and about 180° C. and maintaining it between these limits for several hours.

7. Textile material, colored or printed with a direct dyestuff and aftertreated with a member selected from the group consisting of a water-soluble polymeric organic nitrogen compound, obtained by heating, as sole reactants, one mol of an amine of the formula $$H_2N(C_2H_4NH)_mC_2H_4NH_2$$

wherein $m$ is a positive integer, with two equivalents of a compound selected from the group consisting of monomeric and dimeric cyanamide until ammonia is evolved and then raising the temperature to between about 125° and about 180° C. and maintaining it between these limits for several hours, and the water-soluble salts and complex copper compounds thereof.

8. Textile material colored or printed with a direct dyestuff and aftertreated with a water-soluble polymeric organic nitrogen compound, obtained by heating, as sole reactants, one mol of diethylenetriamine and one mol of dicyandiamide to a temperature of about 125° C. to about 180° C. for several hours, whereby ammonia is evolved.

9. Textile material, colored or printed with a direct dyestuff and aftertreated with a water-soluble polymeric organic nitrogen compound, obtained by heating, as sole reactants, one mol of triethylenetetramine and one mol of dicyandiamide to a temperature of about 140° C. for several hours, whereby ammonia is evolved.

10. Textile material, colored or printed with a direct dyestuff and after treated with a water-soluble polymeric organic nitrogen compound, which may be obtained by heating, as sole reactants, one mol of tetraethylenepentamine with one mol of dicyandiamide to a temperature of about 115° C. to about 170° C. for several hours, whereby ammonia is evolved.

11. Textile material, colored or printed with a direct dyestuff and aftertreated with a complex copper compound of a water-soluble polymeric organic nitrogen compound, which may be obtained by heating, as sole reactants, one mol of diethylenetriamine and one mol of dicyandiamide to a temperature of about 125° C. to about 180° C. for several hours, whereby ammonia is evolved.

HANS MARTIN HEMMI.
PAUL TREFZER.

References Cited in the file of this patent

UNITED STATES PATENTS

| Number | Name | Date |
|---|---|---|
| 2,214,067 | Petersen | Sept. 10, 1940 |
| 2,268,273 | Wilkes | Dec. 30, 1941 |
| 2,364,725 | Landolt | Dec. 12, 1944 |
| 2,364,726 | Landolt | Dec. 12, 1944 |
| 2,376,891 | Alles | May 29, 1945 |
| 2,526,106 | Olbrecht | Oct. 17, 1950 |

FOREIGN PATENTS

| Number | Country | Date |
|---|---|---|
| 522,539 | Great Britain | June 20, 1940 |
| 822,252 | France | Sept. 13, 1937 |